United States Patent [19]

Tanaka et al.

[11] Patent Number: 5,812,337
[45] Date of Patent: Sep. 22, 1998

[54] MAGNETIC DISK DEVICE USING REPRODUCING HEAD HAVING A LARGE REPRODUCING WIDTH

[75] Inventors: Yoichiro Tanaka, Kawasaki; Yuji Kubota; Norio Nakamura, both of Yokohama, all of Japan

[73] Assignee: Kabushiki Kaisha Toshiba, Kawasaki, Japan

[21] Appl. No.: 535,894

[22] Filed: Sep. 28, 1995

[30] Foreign Application Priority Data

Sep. 30, 1994 [JP] Japan .................................. 6-238101

[51] Int. Cl.⁶ .................................. G11B 15/52
[52] U.S. Cl. .................................. 360/73.12; 360/78.14; 360/60; 360/78.06
[58] Field of Search .................. 360/77.02, 77.08, 360/78.14, 66, 119, 122, 118, 73.09, 73.11, 73.12, 60, 78.07, 78.06

[56] References Cited

U.S. PATENT DOCUMENTS

| 5,111,349 | 5/1992 | Moon ................................... 360/78.07 |
| 5,383,068 | 1/1995 | Shimizu et al. ..................... 360/78.06 |

FOREIGN PATENT DOCUMENTS 5-12628 1/1993 Japan .

OTHER PUBLICATIONS

Magnetic Recording, by Mee et al © 1988 Paras: 2, 1.2, 2.1.3, 2, 2.1, Dec. 1988.

IEEE Transactions on Magnetics, vol. 13, No. 5, pp. 1457–1459; Hughes et al; "Recording Head Side Read/Write Effects", Sep. 1977.

IEEE Transactions on Magnetics, vol. 26, No. 5 "Gigabit Density Recording Using Dual–Element MR/Inductive Head on Thin–Film Disks", C. Tsang, et al. Sep. 1990, pp. 1689–1693.

IEEE Transactions on Magnetics, vol. 26, No. 5, "Demonstration of 500 Megabits Per Square Inch with Digital Magnetic Recording", R.A. Jensen, et al. Sep. 1990, pp. 2169–2171.

IEEE Transactions on Magnetics, vol. 26, No. 5, "Error Rate Performance of Experimental Gigabit Per Square Inch Recording Components", T.D. Howell, et al. Sep. 1990, pp. 2298–2302.

IEEE Transcations on Magnetics, vol. 27, No. 6, "Submicron–Trackwidth Inductive/MR Composite Head", H. Takano, et al. Nov. 1991, pp. 4678–4683.

IEEE Transactions on Magnetics, vol. 27, No. 6, "Investigation of 2 Gb/In₂ Magnetic Recording at a Track Density of 17 KTPI", M. Futamoto, et al. Nov. 1991, pp. 5280–5285.

*Primary Examiner*—Aristotelis M. Psitos
*Assistant Examiner*—Alan Faber
*Attorney, Agent, or Firm*—Oblon, Spivak, McClelland, Maier & Neustadt, P.C.

[57] ABSTRACT

A magnetic disk drive capable of performing a head seek at high speed even when a track pitch of the recording track of the magnetic disk is narrowed. The structure eliminates incomplete erasure caused by a positioning error of a recording head and prevents side-fringe magnetic field from erasing a signal on an adjacent track in order to obtain a larger reproduction output.

17 Claims, 7 Drawing Sheets

MAGNETIC DISK DEVICE USING REPRODUCING HEAD HAVING A LARGE REPRODUCING WIDTH

BACKGROUND OF THE INVENTION

1. Field of the Invention

The present invention relates to a magnetic disk device such as a hard disk device.

2. Description of the Related Art

In recent years, a magnetic disk device such as a hard disk device has been popularly used as a random-accessible external storage device having a large capacity in the field of computers. As the magnetic disk device is widely applied, an increase in storage capacity and an increase in recording density are strongly demanded. For this reason, in order to meet these demands, research and development have been performed in various fields.

In general, a hard disk comprises a rotatable magnetic recording medium and a magnetic head member. The magnetic recording medium is constituted such that a plurality of magnetic disks each obtained by forming a magnetic layer on a nonmagnetic substrate are stacked and mounted on rotating shaft. The magnetic head member is constituted such that recording/reproducing heads are arranged on an arm moved by an actuator. In this case, the recording/reproducing heads are arranged on the respective disk surfaces, and the heads are positioned such that the arms are moved by the actuator.

When information is to be recorded/reproduced by the hard disk device having the above structure, each of the heads is not brought into direct contact with a corresponding one of the disk surfaces rotated at high speed, and the head accesses a predetermined position of the disk surface while the head slightly floats from the disk surface. A signal is recorded by the head along concentric tracks on the disk surface, or the recorded signal is reproduced therefrom.

In the above hard disk device, in order to meet a demand of increasing a storage capacity, the following attempts have been performed. That is, the line recording density of a disk, i.e., a density in a direction of a track length, is increased to increase a track density, thereby increasing a recording density.

In recent years, in order to increase a recording density, the search and development of contact recording in which a head floats at a very low level or brought into almost contact with a recording medium to record/reproduce a signal are energetically performed.

As a method of increasing a record density, a perpendicular magnetic recording scheme was proposed in 1975. According to this perpendicular magnetic recording scheme, the demagnetization field of a magnetization transition portion is theoretically much smaller than that of a conventional longitudinal magnetic recording scheme in which an anisotropy is formed in a longitudinal direction. For this reason, the width of the magnetization transition is decreased, and high-density recording can be performed. In addition, according to the perpendicular magnetic recording schemes, a recording magnetic field having a more perpendicular direction can be obtained by a perpendicular magnetic recording head using a strip-like soft magnetic thin film. It is known that the perpendicular magnetic recording schemes is effective to increase a recording density.

In order to increase recording/reproducing efficiency to form sharp magnetization transition, a vertical two-layered medium in which a soft magnetic backing layer is formed under a perpendicular anisotropic layer was proposed and has been developed. In this medium, the magnitude of a demagnetization field at the distal end of a head is decreased by magnetic interaction of the head and the soft magnetic backing layer, and a generated magnetic field having a large magnitude can be obtained. In reproduction, as in the recording, since the magnitude of demagnetization field at the distal end of the head is small, an effective magnetic permeability is increased, and magnetic fluxes from the medium are effectively converged on the head, thereby obtaining a signal having a large magnitude.

On the other hand, in order to improve sensitivity in signal reproduction, an active head such as an MR head using a magnetoresistance effect is popularly developed. The MR head is a head for converting a magnetic flux from a recording medium into an electrical signal using the nature in which the electric resistance of a soft magnetic material such as a permalloy is changed by an external magnetic field. Since this head performs reproduction such that a change in electric resistance of an MR element into a change in voltage, the reproduction sensitivity of the head is proportional to the magnitude of a sense current flowing in the soft magnetic material. For this reason, even when a relative speed of the head and the medium is low, a large output can be obtained, and a line recording density can be increased. In addition, as will be described in the following References 1 to 5, the large output from the MR head is effectively used to decrease a track width, so that a track density can be increased to a maximum of 17,000 TPI (track per inches).

Reference 1: IEEE transactions on Magnetics, Vol. 26, No. 5, 1689–1693 (1990); C. Tsang, M. Chen, T. Yogi and K. Ju, "Gigabit Density Recording Using Dualelement MR/Inductive Heads on Tin Film Disks";

Reference 2: IEEE transactions on Magnetics, Vol. 26, No. 5, 2169–2171 (1990); R. Jensen, J. Mortelmans and R. hauswitzer, "Demonstration of 500 Megabits per Square Inch with Digital Magnetic Recording";

Reference 3: IEEE transactions on Magnetics, Vol. 26, No. 5, 2298–2302 (1990); T. Howell, D. McCown, I. Diola, Y. Tang, K. Hense and R. Gee, "Error Rate Performance of Experimental Gigabit per Square Inch Recording Components";

Reference 4: IEEE transactions on Magnetics, Vol. 27, No. 6, 4678–4683 (1991); T. Takano, H. Futamoto, M. Suzuki, K. Shiiki and M. Kitaba, "Submicron-Track width Inductive/MR Composite Head"; and Reference 5: IEEE transactions on Magnetics, Vol. 27, No. 6, 5280–5285 (1991); M. Futamoto, F. Kugiya, H. Takano, Y. Matsuda, N. Inaba, Y. Miyamura, K. Akagi, T. Nakao, H. Sawaguchi, H. Fukuoka, T. Munemoto and T. Takagaki, "Investigation of 2Gb/in2 Magnetic Recording at a Track Density of 17kTPI".

In the magnetic disk device, a head seek is performed. The head seek is an operation of reading servo data such as cylinder address data on the magnetic disk by the reproduction head to be moved on a target track by use of a head device having a recording head and a reproducing head. In this case, generally, the head is moved in a radial direction of the disk at high speed in the first half of the head seek, and the seek speed is reduced in the second half. Then, at the final stage of the head seek, the seek speed is reduced to be extremely low, and the head is controlled to be adjustably set onto a target track.

In the case where the track pitch of the recording track on the magnetic disk and the track width are narrowed at the same time to achieve further high density recording, a reproduction width Tr defined by a reproducing head becomes smaller than a distance between effective signal regions on the adjacent recording tracks, the following problem occurs.

More specifically, for controlling the head to be adjustably set onto the target track in the second half of the head seek, the head enters the region where no effective signal exists between the tracks, there is high possibility that servo data such as cylinder address data, which is necessary to control the head to be adjustably set onto the target track, cannot be read. In addition, in a state that the head enters the region where no effective signal exists between the tracks, the seek speed becomes extremely low at the time of controlling the head to be adjustably set onto the target track. Due to this, there occurs a case in which servo data on continuous two servo sectors cannot be read. As a result, it takes a very long time to control the head to be adjustably set onto the target track, and average seek time is increased, and there occurs a problem in which data recording/reproducing speed is lowered.

On the other hand, in the above-mentioned magnetic disk device, when a positioning error of a head for a track, that is, a tracking error, is presented, a so-called incomplete erasure phenomenon in which magnetization of an old recording signal is left by the tracking error at the time of recording. Therefore, in a case where the recorded signal is reproduced, an incompletely erased signal is reproduced as noise in addition to the signals to be reproduced by the tracking error at the time of reproducing, and a ratio of a signal to noise (SNR) is reduced.

As a technique for reducing the incomplete erasure or reducing an influence of the incomplete ensure, the following methods are known.

As a first method, a non-signal region (a non-signal region formed in the following manner called an erase region) in which a substantially effective signal is not present is formed on each of both the side edges of a tracking track using an erasing effect obtained by a magnetic field (called a side-fringe magnetic field) leaking from the gap of a recording head to the outside of the recording track, thereby reducing incomplete erasure. However, when a track density is increased by decreasing a track pitch, the side-fringe magnetic field may largely erase a signal on an adjacent track.

As a second method, a reproduction width Tr defined by the reproducing head is set to be smaller than the recording track width Tw defined by the recording head not to reproduce incomplete erasure (indicated by oblique lines) as much as possible.

Although this method can reduce noise generated by the incomplete erasure, since a reproduction output is decreased by a decrease in reproduction track width, an SNR cannot be sufficiently increased.

SUMMARY OF THE INVENTION

An object of the present invention is to provide a magnetic disk device capable of performing a head seek at high speed even when a track pitch the track pitch of the recording track on the magnetic disk is narrowed.

Another object of the present invention is to provide a magnetic disk capable of performing a head seek at high speed even when a track pitch the track pitch of the recording track on the magnetic disk is narrowed, and eliminating incomplete erasure caused by a positioning error of a recording head, and preventing a side-fringe magnetic field from erasing a signal on an adjacent track to obtain a larger reproduction output.

The above object is achieved by the following magnetic disk device. That is, a magnetic disk device comprising a magnetic disk having a plurality of recording tracks each having an effective signal region, and a plurality of sectors; and a head device having a head width sized such that a signal can be received from both adjacent effective signal regions in a final stage of a seek operation satisfying $Vc/Vr>S/(Tp-Tw+2\delta)$. Also, the above object is achieved by the following magnetic device. That is, a magnetic device comprising: a head device having at least a recording head having at least either a recording width Tw or a reproducing head having a reproduction width Tr to satisfy at least either $Tr>Tp-Tw+2\delta$ or $Tr/2>Tp-Tw+2\delta$; a magnetic disk having a plurality of recording tracks each having an effective signal region, and a plurality of sectors; and controlling means for providing a seek operation of the head device and the magnetic disk to satisfy $Vc/Vr>S/(Tp-Tw+2\delta)$.

In this case, Vc=a relative speed between the magnetic disk and the head device, Vr=a head seek speed in a track width direction of the head device, S=a sector pitch, Tp=a track pitch, Tw=a recording width, and $\delta$=a tracking error.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The principle of the present invention will be described below prior to a description of preferred various embodiments. That is, the gist of the present invention lies in that a reproducing head having a reproduction width larger than a distance between effective signal regions on the adjacent recording tracks are used in order that the servo data, which is necessary for a head seek, such as cylinder address data can be read without fail even in a head seek state, so that a high-speed head seek can be performed.

More specifically, the magnetic disk device of the present invention comprises a recording head for a recording signal to a magnetic disk along a recording track of a predetermined track pitch and a reproducing head for reproducing the signal recorded to the magnetic disk.

According to the present invention, the magnetic disk, which performs the head seek at a final stage of a seek operation under a condition that the following inequation (1) is satisfied, is set forth as a premise.

$$Vc/Vr > S/(Tp-Tw+2\delta) \tag{1}$$

wherein TP: a track pitch, Tw: a recording track width defined by the recording head, Tr: a reproducing width defined by the reproducing head, δ: a tracking error, Vc: a relative speed among the magnetic disk, the recording head, and the reproducing head, Vr: a head seek speed in a track width direction of the recording head and the reproducing head, and S: a sector pitch on the magnetic disk.

The recording width of the magnetic disk in which the above-mentioned condition is satisfied is set to satisfy the following inequations (2) and (3).

$$Tr > Tp-Tw+2\delta \tag{2}$$

$$Tr/2 > TP-Tw+2\delta \tag{3}$$

The inequation (1) is the condition in which the recording head and the reproducing head are moved between the adjacent recording tracks at a very low speed at the final stage of the head seek. This condition will be described in more detail.

More specifically, an amount of movement of the heads in a track width direction, which is from a position of servo data placed at an end portion of a data sector on a certain recording track to a position placed at an end portion of the data sector on the adjacent recording track, does not satisfy the distance between the effective signal regions (recording track effective signal regions) on the adjacent recording tracks, that is, effective track gap Tp−Tw+2δ.

The inequation (2) means that the reproducing width Tr is set to be larger than the effective track gap Gt=Tp−Tw+2δ. Moreover, the inequation (3) means that the reproducing width Tr is set to be larger than the double of the effective track gap Gt=Tp−Tw+2δ.

According to the magnetic disk device of the present invention, a ratio of the tracking error δ to the track pitch Tp, δ/Tp is δ/Tp>0.04 based on a condition that the inequations (2) and (3) are satisfied.

Moreover, according to the magnetic disk device of the present invention, the following equation (4) is satisfied when E: a width of an erase region where the effective signal is not substantially present at both ends of the recording track on the magnetic disk based on a condition that the inequations (2) and (3) are satisfied.

$$E \leq Tp-Tw \tag{4}$$

Moreover, according to the magnetic disk device of the present invention, the following inequation (5) is satisfied when Tp−Tw=2a based on a condition that the inequations (2) and (3) are satisfied.

$$Tr < Tp+2a \tag{5}$$

The above-mentioned erase region is formed as follows.

More specifically, according to one specific form of the present invention, in a case where a ring-shaped head having a magnetic gap is used as a recording head, the erase region can be formed by satisfying the following inequations.

$$g < (1500/Hc-Hc/4000\pi+0.3)/(Hc/400\pi-\frac{1}{2}),$$

and $$g \geq (1500/Hc-Hc/4000\pi+0.3-Tp+Tw)/(Hc/400\pi-\frac{1}{2})$$

wherein g [μm]: a gap length of the magnetic of the magnetic gap, Tw [μm]: a recording width in a recording width direction, Tp [μm]: a tracking pitch, and Hc [Oe]: coercive force of the magnetic disk.

According to the other specific form of the present invention, in a case where the recording head is a head in which an end portion in a recording track width direction has a main pole piece formed in a tapered shape to have a narrow trailing side is used, the erase region can be formed by satisfying the inequation, 0<p≦Tp−Tw, wherein p: a length of the tapered portion of the recording head in the recording width direction; Tw: a length of a non-tapered portion in the recording width direction, and Tp: the tracking pitch. In this case, as a recording medium, there is used a perpendicular magnetic disk, preferably a vertical two-layered medium in which a soft magnetic backing layer is formed.

According to the above-mentioned principle of the invention, the following function will be explained.

More specifically, in the magnetic disk device such as the hard disk device, the signal recording is performed as the recording head is varying in the track width direction in a range in accordance with the tracking error. Then, noise, which is not substantially effective, such as a residual signal of the track to be recorded for a positional variation of the recording head, or a leak signal of the adjacent track is recorded in the region of the end portion of the track width direction of the recording track or the region between the adjacent tracks.

On the other hand, even if such a positional variation of the recording head occurs, there exists an region where a normal signal is recorded in a central portion of the track width direction of the recording track. Such an region is called a recording track effective signal region. A width Te of the recording track effective signal region is determined by the recording width Tw and the tracking error δ, that is, the width Te can be obtained by an equation of Te=Tw−2δ. The distance between the adjacent recording track effective signal regions (called effective track gap) Gt can be obtained by subtract the width Tw from the track pitch Tp, that is, the equation of Gt=Tp−Tw+2δ.

It is needed that servo data such as cylinder address data be accurately read on the cylinder before a target track when the head seeks toward the target track, particularly, the seek speed is reduced close to the target track. In this case, according to the present invention, there is used the reproducing head having the reproducing width Tr, which is larger than Tp−Tw+2δ as shown in the inequation (2). Thereby, in a case where the head is adjustably set onto the target track at the final stage of the head seek, at least a part of the reproducing head is poisoned on any one of the recording effective signal regions even if the head enters the region of the effective track gap under the condition shown in the inequation (1). For this reason, it is possible to read servo data, which is recorded in the region and which is necessary to the head seek. Therefore, seek time can be largely reduced.

As shown in the inequation (3), if the reproducing head having the reproducing width Tr, which is larger than the double of the effective track gap Gt=Tp−Tw+2δ, a half or more of the length of the track width direction of the reproducing head is mounted on the recording track effective signal regions of two adjacent tracks. Due to this, servo data, which is necessary to the head seek, can be read with higher quality.

Moreover, according to the present invention, in a case where the ratio of the tracking error δ to the track pitch Tp, δ/Tp is δ/Tp>0.04, effect for reducing the average seek time of the head seek can be considerably exerted. The average seek time is a sum of head moving time between the track before seeking and the target track and time for controlling the head to be adjustably set to the target track by extremely delaying the head moving speed when the head is close to the target track. In this case, the percentage of time, which is needed to control the head to be adjustably set to the target track, is much larger than the head moving time. Time, which is needed to control the head to be adjustably set to the target track, depends on the value of the tracking error δ and that of the track pitch Tp. In other words, the smaller the track pitch Tp is, the longer time becomes, or the larger the tracking error δ is, the longer time becomes. According to the experiment made by the inventor of the present invention, in the conventional case in which the reproducing width Tr is set to be smaller than the effective track gap, the following point was confirmed.

More specifically, there is a tendency that the average seek time is rapidly increased to, for example, 12 msec and more in a condition of δ/Tp>0.04.

In contrast, according to the present invention, time, which is needed to control the head to be adjustably set to the target track, can be effectively reduced by satisfying the above-mentioned inequations (2) or (3). For this reason, average seek time can be controlled to be smaller than 12 msec even in a condition of δ/Tp>0.04. As a result, even if track pitch Tp, which is related to the tracking error δ determined by accuracy of a mechanism system such as a bearing of a spindle motor and a head actuator, is much narrowed, average seek time can be set to an allowable value. Therefore, a surface recording density can be improved without reducing the head seek speed.

In the preferred embodiments of the magnetic disk device of the present invention, the erase region is formed on both ends of the recording track of the magnetic disk, thereby avoiding an incomplete erasure phenomenon caused by a track positioning error of the recording head. In addition, a side-fringe magnetic field does not unnecessarily erase a signal of the adjacent track. In this case, if the reproducing width Tr is set to be larger than the recording width Tw, a large reproducing output can be obtained, thereby increasing an SNR.

In a case the recording is performed by use of the ring-shaped recording head, the erase region can be formed by use of the side-fringe magnetic field leaking from the gap of the recording head to the outside of the track if the following inequations are satisfied.

$$g < (1500/Hc - Hc/4000 \ \pi + 0.3)/(Hc/400 \ \pi - \tfrac{1}{2}),$$

and $$g \geq (1500/Hc - Hc/4000 \ \pi + 0.3 - Tp + Tw)/(Hc/400 \ \pi - \tfrac{1}{2})$$

wherein g [μm]: a gap length of the magnetic of the magnetic gap, Tw [μm]: a recording width in a recording width direction, Tp [μm]: a tracking pitch, and Hc [Oe]: coercive force of the magnetic disk.

Thereby, the incomplete erasure phenomenon, which is caused by a track positioning error of the recording head, can be avoided. In addition, the side-fringe magnetic field does not unnecessarily erase the signal of the adjacent track.

In other words, by the erase region can be formed by use of the side-fringe magnetic field leaking from the gap of the recording head to the outside of the track, there can be formed a non-signal region in which a substantially effective signal is not especially in a short-wavelength region is formed on each of both side edges of the recording track. The non-signal region formed by the side-fringe magnetic field is called an erase region. A width (called an erase width) E of the erase region is determined by a magnetic field generated by the recording head, the gap width of the recording head, and a coercive force Hc of the recording medium. In this case, the magnetic field generated by the recording head mainly depends on the gap length and the coercive force.

More specifically, as expressed in equations (7) and (8) in the following Reference 6, the erase width E is expressed by the following equations (6) and (7).

Reference 6: IEEE transactions on Magnetics, Vol. 13, No. 5, 1457–1459 (1977); G. F., Hughes and D. S. Bloomberg, "Recording Head Side Read/Write Effects", $$E = Z_0[\{2Hc/Hg + \tfrac{5}{4})^2 - (d/Z_0)(4Hc/Hg + d/Z_0) + \tfrac{1}{2})\}^{1/2} - (2Hc/Hg - \tfrac{1}{4})] \ [\mu m] \quad (6)$$

$$Z_0 = 0.76 g / \tan(\pi Hc/2Hg) \quad (7)$$

wherein Hc: longitudinal coercive force of the recording medium [Oe], Hg: a magnetic filed in recording gap [Oe], d: a distance between the head and the medium [μm], g: a gap length.

In this case, when the ring shaped recording head is regarded as a toroidal core having a small gap having the length g, the magnetic field Hg in the gap can be expressed by the following equation (8) with a simple calculation.

$$Hg = 4000 \ \pi \cdot NI/(g + pAg/\mu Ac)[Oe] \quad (8)$$

wherein NI: recording magnetomotive force [A·T], p: a recording head magnetic path length [μm], Ag: a sectional area of a gap portion [μm²], Ac: a sectional area of a magnetic core portion [μm²], and μ: a relative magnetic permeability of the magnetic core.

In a practical thin film recording head, a saturation magnetic flux density Bs of a head magnetic core is about 1 kG, a relative magnetic permeability μ is several hundreds, a magnetic path length p is several tens μm, Ag/Ac=1 is satisfied near the gap, and a gap length g is 1 μm or less. In this thin film recording head, since a condition in which a magnetic flux density in the gap does not exceed the saturation magnetic flux density of the magnetic core must be satisfied, the equation (8) can be approximately expressed by the following equation (9).

$$Hg=800 \ \pi/(g+0.1)[Oe] \quad (9)$$

In order to obtain a sufficient recording capability, Hg>>Hc must be satisfied. For this reason, the equation (7) can be approximated by the equation (9) as expressed by the following equation (10).

$$Z_0=1200/Hc \cdot g/(g+0.1)[\mu m] \quad (10)$$

Equations (9) and (10) are substituted into the following equation (6), the resultant equation is approximated using a condition that d is sufficiently smaller than g, and a term for correcting an error caused by the approximation is added. In this case, the erase width E can be expressed by the following equation (11).

$$E=g\{\frac{1}{2}+1500/Hc(g+0.1)\}-Hc(g+0.1)/400 \ \pi+0.3 \quad (11)$$

In order to eliminate incomplete erasure caused by the tracking positioning error, when the maximum value of the positioning error is set to be 2δ, the maximum value 2δ satisfies E>2δ. Although 2δ can be decreased by improving tracking servo precision and improving the decentering precision of disk spindle, 2δ cannot be substantially set to be 0. Therefore, when at least E>0 or, preferably, E>2δ is satisfied, incomplete erasure can be eliminated. When this condition is calculated on the basis of the equation (11), the following inequation (12) can be obtained.

$$g>(1500/Hc-Hc/4000\pi+0.3)/(Hc/400\pi-\frac{1}{2}) \quad (12)$$

In addition, when a finite erase width is to be formed, a recorded signal of the adjacent track must not be unnecessarily erased. In other words, the recording track is allowed to be subjected to erasure by the adjacent track such that signal quality of the recording track is not influenced in reproduction. Therefore, a maximum track density can be obtained.

Assuming that the track pitch and the recording track width of the recording head are represented by Tp and Tw, when the following inequation (4) is satisfied, the above condition is satisfied, the track density can be increased without degrading signal quality.

$$E \leq Tp-Tw \quad (4)$$

The above condition is calculated on the basis of the following inequation (13) can be obtained, the following equation (13) can be obtained.

$$g \geq (1500/Hc-Hc/4000\pi+0.3-Tp+Tw)/(Hc/400\pi-\frac{1}{2}) \quad (13)$$

In a magnetic disk device in which data signals and servo signals for tracking are recorded in the same track, when different servo signals are recorded on both sides of the center line of the data data, which center line is used as a boundary, an erase region having a width E defined by the recording head is present at a boundary portion, and this portion has no servo signal. When a servo signal is to be read by a reproducing head having a reproduction width Tr, since reproduction is performed across the erase region of the servo signal, a substantial servo signal width becomes Tr−E. In this case, when the width Tr of the reproducing head is set to be larger than Tw+E, the servo signal erased by the erase region is compensated, and a servo signal having good signal quality can be reproduced, thereby improving tracking precision. In consideration of E>0, Tr>Tw, that is, a>b.

Moreover, as shown in the following inequation (5), the reproduction track width Tr is set to be smaller than Tp+2a, the signal quality of the servo and data signals can be improved without erroneously reading data signals of the adjacent track.

$$Tr>Tp+2a \quad (5)$$

Particularly, the above is useful in E≦2δ. It is preferable that the reproduction track width Tr be Tr>Tp+2a−2δ.

As a method of forming an erase region between the recording tracks, in place of using the side-fringe magnetic field, an erasing head, e.g., a head called a tunnel erase head, may be arranged near the recording head, and erase regions may be respectively formed on both sides of the recording track by the erasing head.

On the other hand, a signal is to be recorded in the perpendicular magnetic recording disk, a perpendicular magnetic recording single-pole head in which an end portion in a direction of recording track width has a main pole piece formed in a tapered shape to have a narrow trailing side is used as a recording head, the width of the tapered portion is represented by p, a recording track width is represented by Tw, and a track pitch on the magnetic recording medium is represented by Tp. In this case, the following inequation (14) is satisfied.

$$0<p \leq Tp-Tw \quad (14)$$

More specifically, when a recording medium is a vertical two-layered film medium formed by stacking a soft magnetic backing layer and a perpendicular anisotropic layer, an incomplete erasure phenomenon caused by a track positioning error of the recording head can be avoided by use of side-surface magnetic fields of the single-pole head. Moreover, a signal of an adjacent track is not unnecessarily erased by the side-surface magnetic field.

In other words, in the perpendicular magnetic recording using the perpendicular magnetic recording single-pole head and the perpendicular magnetic recording disk, the side-fringe magnetic field leaking to the outside of a track is very abruptly attenuated, so that an erase region is rarely present. When there is used the head in which an end portion in a direction of recording track width has a main pole piece formed in a tapered shape to have a narrow trailing side, an erase region having a width corresponding to the width of the tapered portion can be formed at each of both side edges of the recording track. In each of the erase region, a magnetization transition having an inclination accurately equal to the taper angle is formed due to a high recording resolution of a perpendicular magnetic recording scheme. However, since an azimuth angle between the reproducing head and the erase region is very large, the erase region cannot give an effective reproduction signal, and the region substantially functions as an erase region. In addition, when a condition wherein the erase region does not unnecessarily erase recording signals of adjacent tracks is also considered, the width of the tapered portion is represented by p, and inequation (14) is satisfied.

The following will explain various preferred embodiments, which is based on the above-mentioned principle of the present invention.

(First Embodiment)

Figure 1:
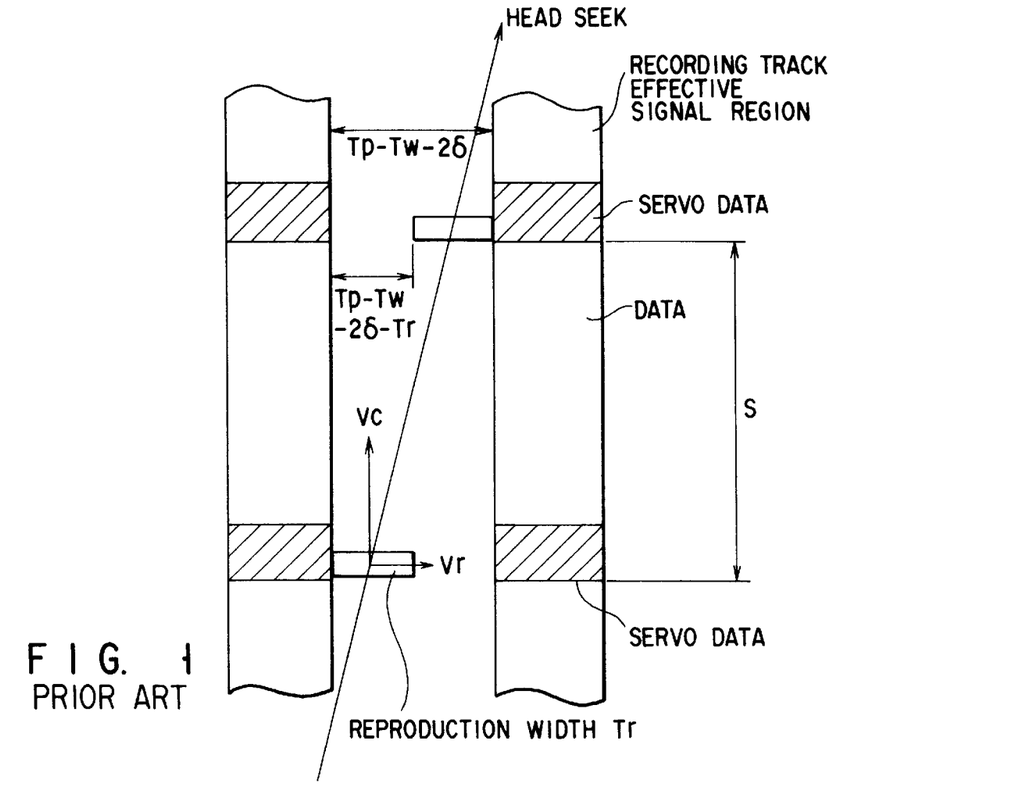
FIGS. 1 and 2 are views explaining the problems of the prior art.
Figure 2:
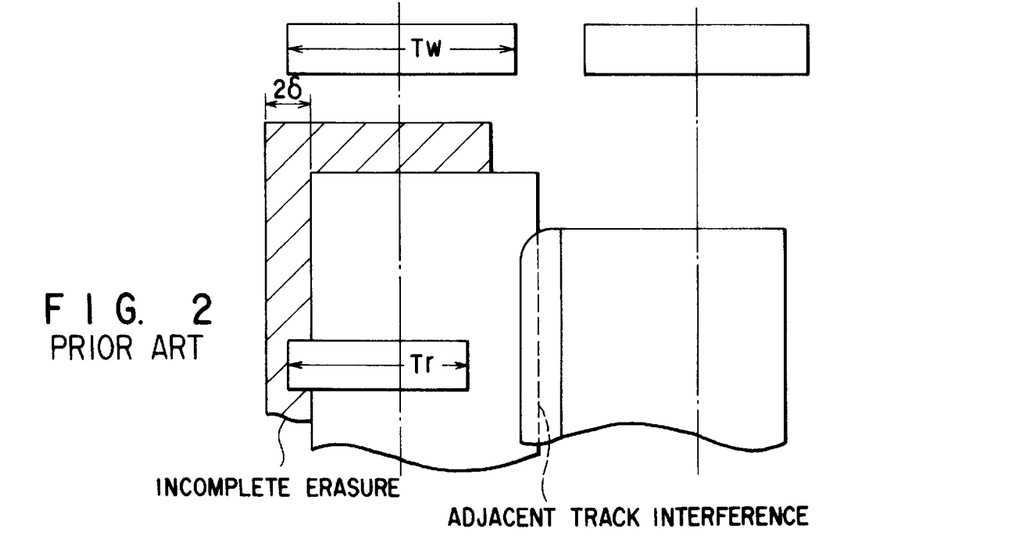
Figure 3:
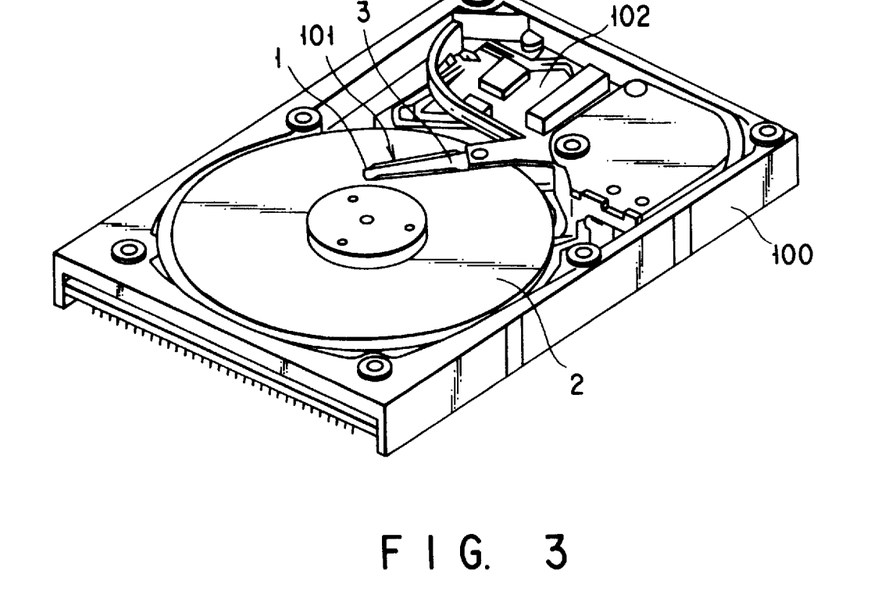
FIG. 3 is a schematic perspective view showing an outline of a magnetic disk device of the present invention.

As shown in FIG. 3, the magnetic disk device of this embodiment is provided such that a magnetic disk 2 is rotatably formed in a case 100. The magnetic disk 2 is rotatably driven by a motor (not shown). Also, a head device 101 is provided in the case 100. The motor for driving the magnetic disk 2 and a driving section for driving a head section 1 are controlled by a servo controlling section 102.

Figure 4:
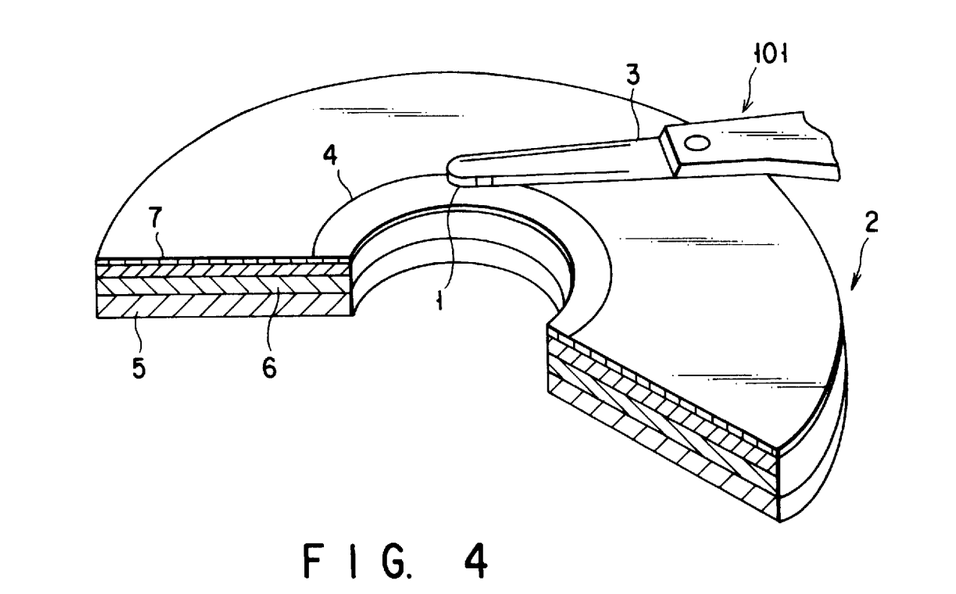
FIG. 4 is a partially sectional perspective view showing the magnetic disk and a head device of the present invention.

The head device 101 comprises the head section 1 and an arm 3 as shown in FIG. 4. FIG. 4 shows a case in which the magnetic disk device is a recording/reproducing magnetic disk device. In this case, the head section 1 includes a recording head 1a and a reproducing head 1b. The recording head is a normal ring-shaped head (induction typed head). The reproducing head is a normal ring-shaped head (induction typed head) or a magnetoresistance effect head (MR head).

In this embodiment, the head section 1 uses the magnetoresistance effect head (MR head) as a reproducing head. The head section 1 is formed in the magnetic disk 2 through the arm 3. The head section 1 is positioned by an actuator (not shown) on a desired track 4 of a plurality of desired tracks concentrically formed in the magnetic disk 2.

In the magnetic disk 2, a recording magnetic layer 6, which is formed of a metallic thin film, and a protection layer 7 are sequentially stacked on a disk-like nonmagnetic substrate 5. More specifically, a glass substrate 5 having a diameter of 2.5 inches and a thickness of 0.635 mm was prepared as the nonmagnetic substrate 5. The recording magnetic layer 6 consisting of CoPt and having a thickness of 0.025 $\mu$m is formed on the glass nonmagnetic substrate 5 by DC magnetron sputtering in an argon gas atmosphere.

The recording magnetic layer 6 is a longitudinal isotropic medium having an easy axis of magnetization in a longitudinal surface direction, and having magnetic anisotropy in a specific direction within the longitudinal surface of the recording magnetic layer 6. The coercive force of the recording magnetic layer 6 in the longitudinal surface direction was 2,800 [Oe]. The protective layer 7, consisting of $SiO_2$, for assuring durability against contact of the head and an insulating property from the MR element was formed by RF sputtering.

The head section 1 is a composite head obtained such that a shield MR head serving as a reproducing head and a ring recording head are formed and stacked by a thin film deposition process at the outflow end (the downstream side in the traveling direction of the recording medium) of a floating slider.

Figure 5:
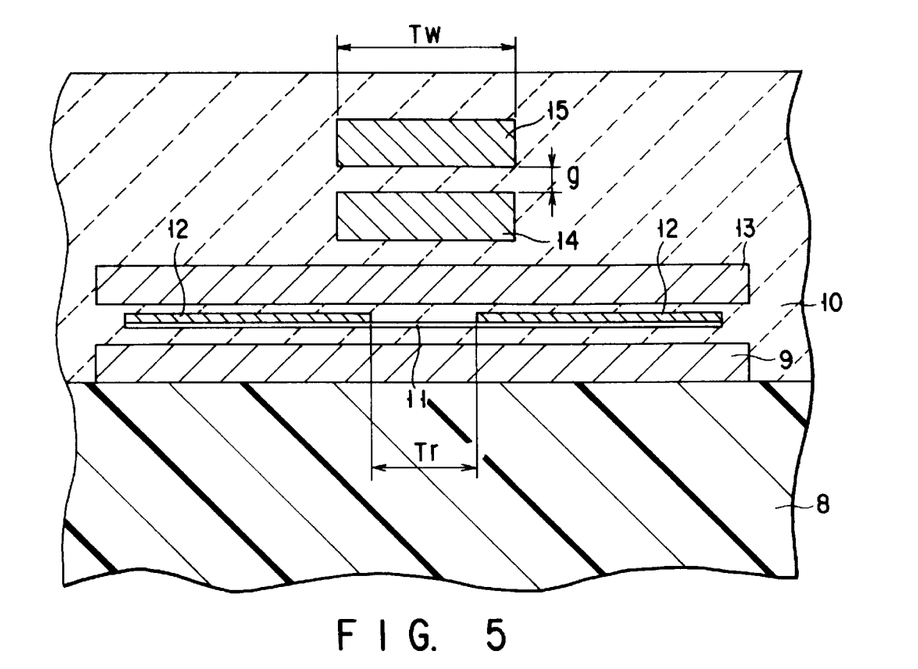
FIG. 5 is a schematic view showing a magnetic head of a first embodiment of the present invention.

FIG. 5 is a view showing the structure of the magnetic head 1 when viewed from a surface opposite to the disk. A permalloy shield layer 9 having a thickness of 1 $\mu$m was formed on a substrate 8 serving as a slider consisting of Al2O3-TiC, and an MR element 11 having a thickness of 0.04 $\mu$m and consisting of a permalloy was formed on the resultant structure through a nonmagnetic insulating layer 10 having a thickness of 0.13 $\mu$m. Leads 12 for supplying a sense current to the MR element 11 were formed on both portions of the MR element 11 at a reproduction width Tr=0.6 $\mu$m, and a permalloy shield layer 13 having a thickness of 1 $\mu$m was formed on the leads 12 through a nonmagnetic insulating layer 10 having a thickness of 0.13 $\mu$m, thereby forming a reproducing shield MR head. In addition, a 1.2 $\mu$m thick magnetic pole piece 14 of a recording ring thin film head was formed on the permalloy shield layer 13 through a nonmagnetic insulating layer 10 having a thickness of 0.5 to 2 $\mu$m, and a magnetic pole piece 15 having a thickness of 1.2 $\mu$m was formed on the magnetic pole piece 14 through a nonmagnetic insulating layer 10 having a thickness g of 0.15 $\mu$m corresponding to a gap length, thereby forming a recording head having a recording track width Tw of 1.0 $\mu$m and a gap length g of 0.15 $\mu$m.

Figure 6:
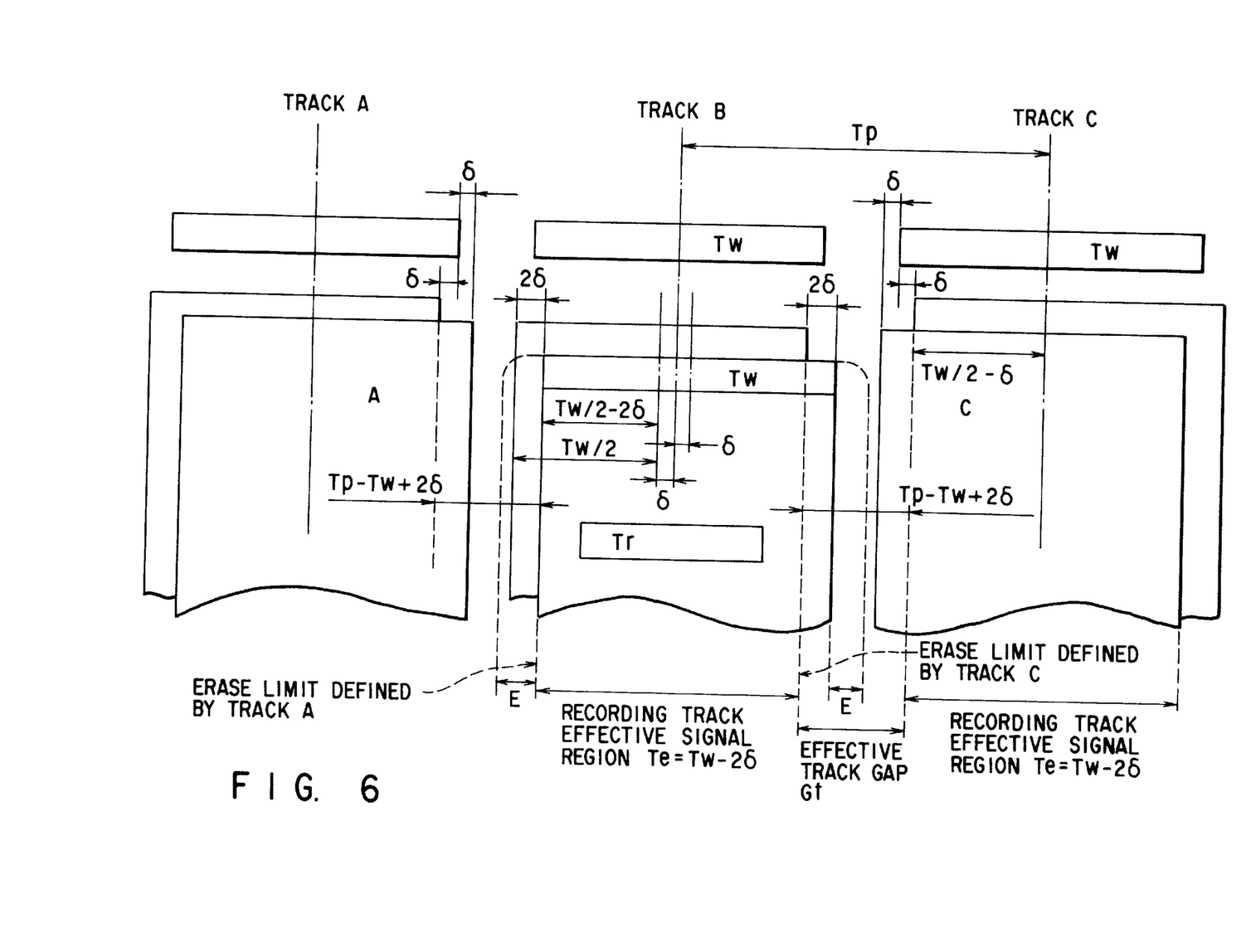
FIG. 6 is a schematic view showing an arrangement of a recording tracks and a forming state of a recording track effective signal region in the first embodiment of the present invention.
Figure 7A:
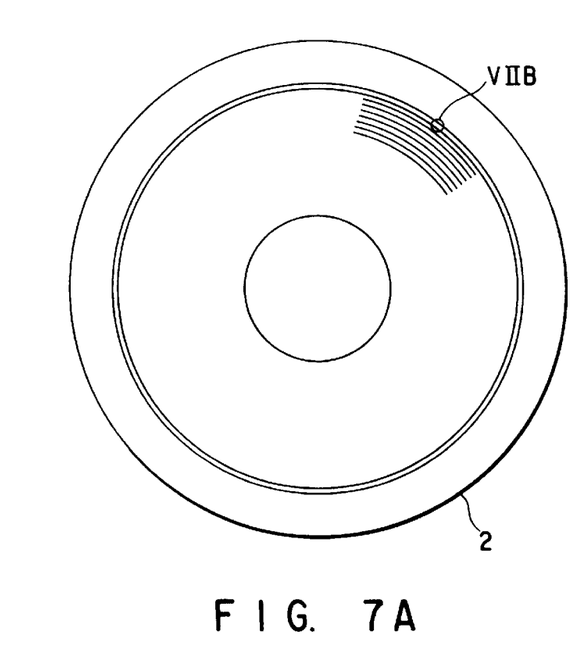
FIGS. 7A and 7B are schematic plane views showing the magnetic disk of the magnetic disk device of the present invention.
Figure 7B:
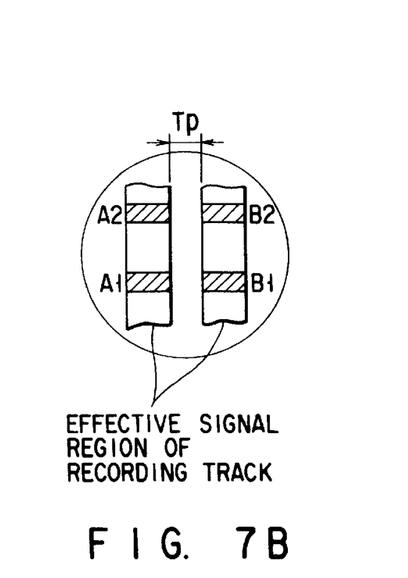

FIG. 6 shows a state of forming recording tracks on the magnetic disk 2 using the head section 1 of FIG. 5. The state of forming the recording track on the magnetic disk 2 can be easily understood from FIGS. 7A and 7B. In FIG. 6, the track pitch Tp is 1.3 $\mu$m. Also, FIG. 6 shows three adjacent tracks. A track density is 19.540 TPI. A space between the head and the medium is 0.04 $\mu$m.

Figure 8:
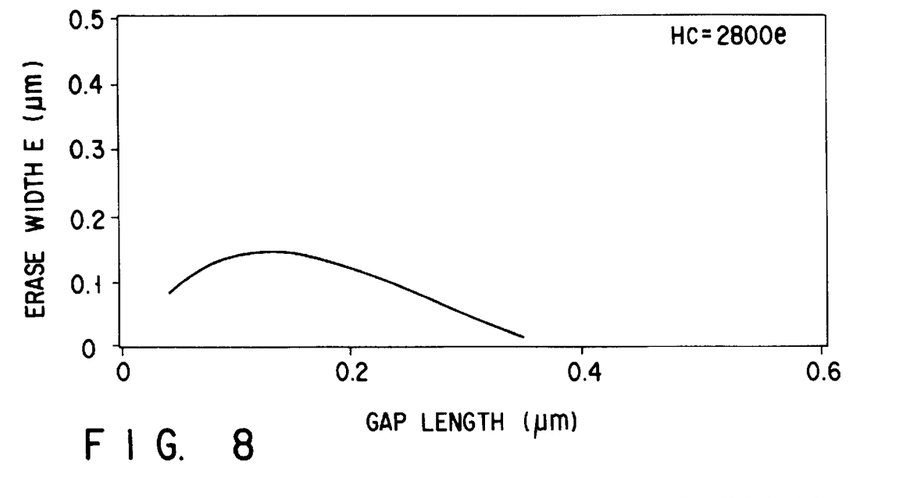
FIG. 8 is a view showing a relationship between a gap length and an erase length in the first embodiment of the present invention.

In FIG. 6, tracks A, B, and C are ordered from the right. In this experiment, assuming that the track positioning error of the recording and reproducing heads (called tracking error) was ±$\delta$, $\delta$ was 0.06 $\mu$m. That is, a maximum error of 2$\delta$=0.12 $\mu$m was generated. In the track B, an old recording signal (indicated by hatched lines) which was incompletely erased and had a wavelength of 0.5 $\mu$m, was recorded at a position shifted to the left from the track center by $\delta$, and a new recording signal having a wavelength of 0.45 $\mu$m was recorded at a position shifted to the right from the track center by $\delta$. In the same track, the new signal was recorded by the maximum shift amount. At this time, in each of the adjacent tracks A and C, a signal having a wavelength of 0.25 $\mu$m was recorded at a position shifted on the track B side by a maximum shift amount of $\delta$. In this state, the width of a non-signal region on each of the recording tracks, i.e., width E (hereinafter called erase length) of the non-signal region (hereinafter called self-erase region) formed on both sides of the track width direction of the magnetic disk by the side-fringe magnetic field of the recording head was 0.14 $\mu$m. FIG. 8 shows a change in erase width E when the gap length g is changed.

With the above arrangement, incomplete erasure on a recording track is eliminated. Even when the reproducing head having a reproduction width Tr reproduces a signal on the track B, an SNR is not deteriorated because an incompletely erased signal is not produced as noise. In addition, the signal quality of the track B is not deteriorated by the erasing operations on the adjacent tracks A or C.

FIG. 6 also shows a state of forming an effective signal region (hereinafter called recording track effective signal region) on the recording track. As mentioned above, there is possibility that the recording width Tw will be formed at a position shifted right and left of the track width direction from the track center by the maximum of $\delta$ because of the tracking error $\delta$. In consideration of such a state, incomplete erasure region of old data is present on the both end portions of the track width direction of the recording track B. Particularly, when the erase width E is smaller than 2$\delta$, such an incomplete erasure is surely generated.

Moreover, even when variation of the position of the recording head is caused by the tracking error $\delta$, the region where the normal signal is recorded, that is, the recording track effective signal region is present at the central section of the recording track. In this case, the width Te of the recording track effective signal region is Te=Tw−2$\delta$. For example, when the recording width Tw=1 $\mu$m, and the tracking error $\delta$=0.06, the width Te of the recording track effective signal region is Te=0.88 $\mu$m. When the track pitch Tp=1.3 $\mu$m, the between the adjacent recording track effective signal regions, that is, effective track gap Gt is Gt=Tp−Te=0.42 $\mu$m. The region of the effective track gap Gt is a portion where no correct signal is recorded by the variation of the position of the recording track, and this region can be regarded as a kind of noise region.

The following will explain a state in which the reproduction head approaches a target track at the time of head seek.

Figure 9:
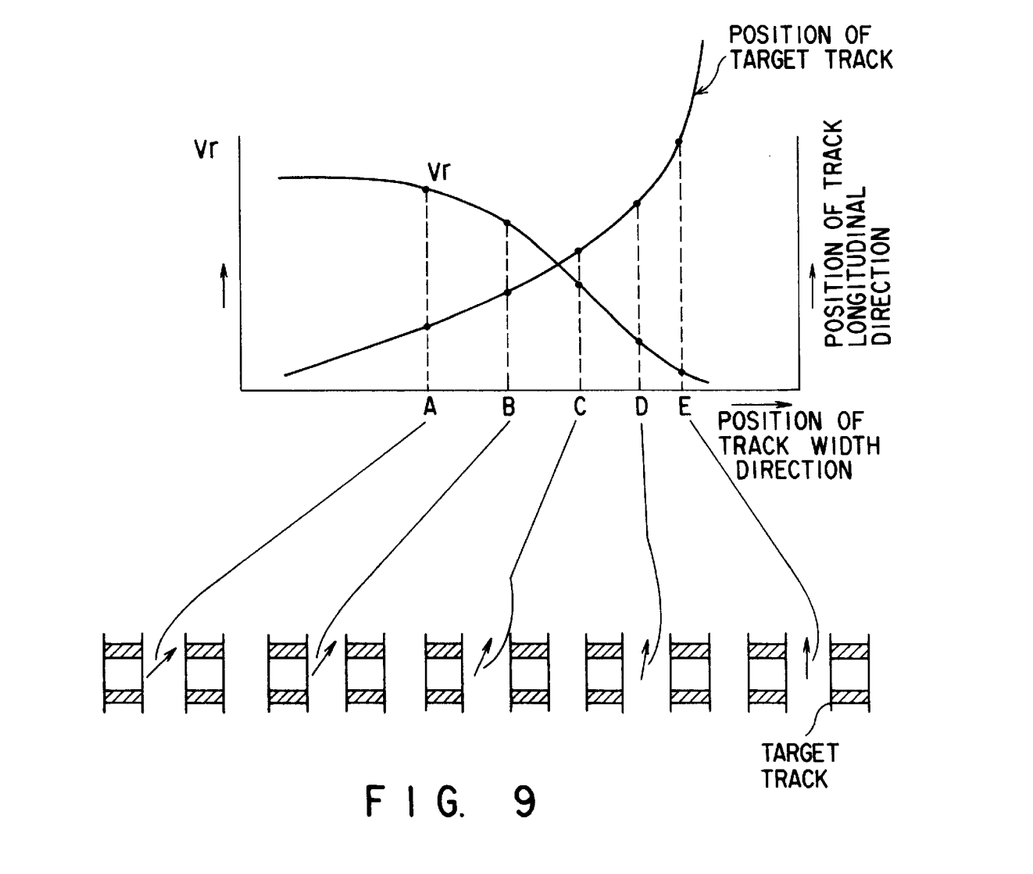
FIG. 9 is a view showing a relationship among Vc, Vr, and a moving track of the magnetic head in the first embodiment of the present invention.
Figure 10:
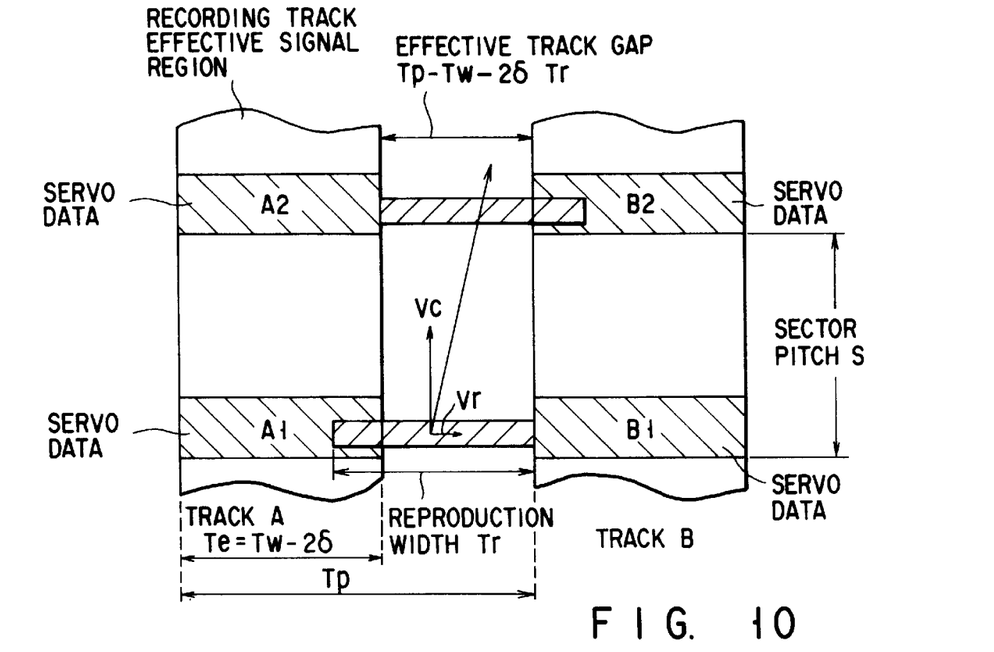
FIG. 10 is a schematic view showing a relationship among a state in that a head seek is performed, a reproduction width and a recording track effective signal region, and an effective track gap in the first embodiment of the present invention.

FIG. 9 shows a moving locus Vr when the reproduction head approaches the target track. The head state at each of the points A to E is shown by an arrow. FIG. 10 is a view showing a state in which the reproduction head is positioned on the effective track gap region when the reproduction approaches a target track B and is reduced to extremely low speed. The reproduction head is moved in a direction of the track B from the track A. A relative speed between the head and disk on the effective track gap region is Vc=9.6 m/sec, a head seek speed is Vr=0.002 m/sec when the reproduction head is adjustably set onto the target track B. Moreover, the pitch between the adjacent sectors on the recording track is S=1.280 µm.

Under this state, Vc/Vr=4,800, and S/(Tp−Tw+2δ)=3, and the condition of Vc/Vr>S/(Tp−Tw+2δ) shown in inequation (1) is satisfied.

Then, the reproduction Tr defined by the reproduction head is 0.6 µm, which is set to be larger than the effective track gap Gt=0.42 µm. In other words, the reproduction width Tr is set to satisfy the condition of Tr>Tp−Tw+2δ shown in inequation (2).

If the condition of inequation (2) is set, at least a part of the track width direction of the reproduction head is surely positioned on either track A or B even when the reproduction head is under a condition of inequation (1) at the time of the head seek, that is, the reproduction head is present in the effective track gap region between the tracks A and B.

Therefore, since the reproduction head can read either servo data A1 on the track A or servo data B2 on the track B, the reproduction head is adjustably set onto the target track B based on read servo data by a tracking servo system (not shown).

As a comparison, if the reproduction width Tr is set to be smaller than the effective track gap Gt, for example, Tr=0.35 µm, the reproduction head is not positioned on either track A or track B while the reproduction head is present in the effective track gap region. Then, there is high possibility that the reproduction head cannot read both servo data A1 and servo data B2, and it takes much time to adjustably set the reproduction head to the target track. The seek time is a sum of head moving time between the tracks and time for controlling the head to be adjustably set to the target track after being close to the target track. The percentage of time, which is needed to control the head to be adjustably set to the target track, is much larger than the head moving time. Therefore, if time for controlling the head to be adjustably set to the target track is increased, the seek time is also increased.

In contrast, according to the present invention, since time for controlling the head to be adjustably set to the target track can be largely reduced, the seek time can be effectively reduced, so that the data recording/reproducing speed can be improved.

The average seek time depends on the track pitch. The smaller the track pitch is, the longer the seek time becomes. As mentioned above, the head moving time between the tracks is short regardless of the track pitch at the time of the head seek. The time for controlling the head to be adjustably set to the target track, which occupies the greater part of the seek time, becomes longer as the track pitch becomes shorter.

Figure 11:
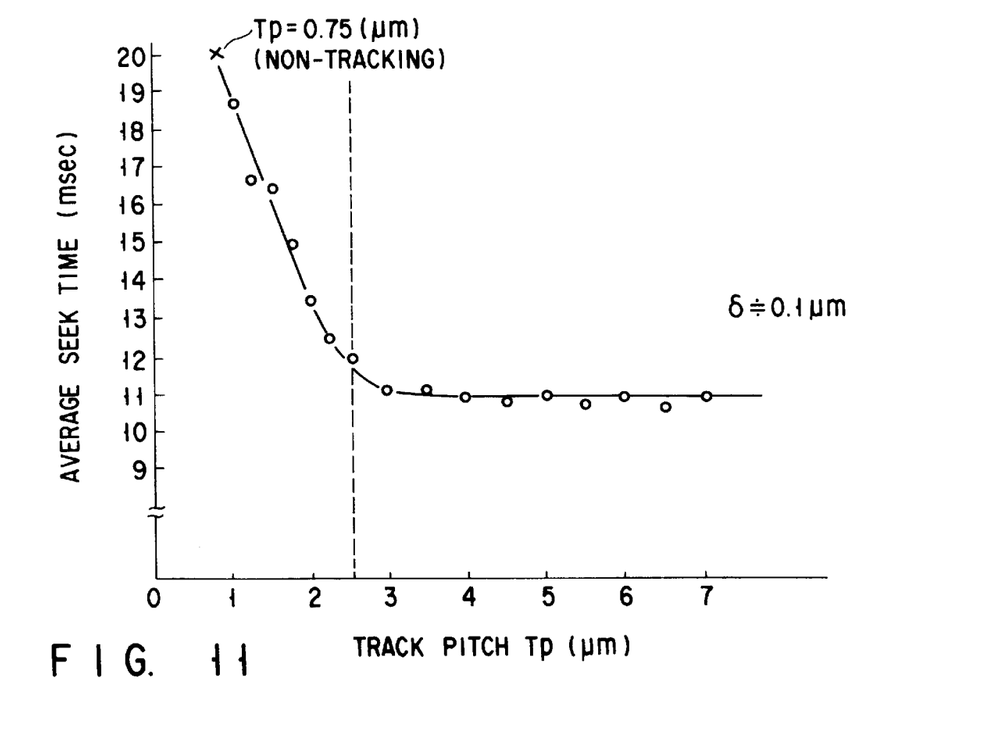
FIG. 11 is a view showing a change of average seek time in a case where a track pitch is changed in a structure in which a value of the reproduction width defined by a reproduction track is set to be smaller than a value of an effective track width in the first embodiment of the present invention.

FIG. 11 shows the conventional structure in which the reproduction width Tr is set to be smaller than the effective track gap Gt as explained in the above comparison. In other words, FIG. 11 shows measured data showing the change of the average seek time when the tracking error δ is 0.1 µm and the track pitch Tp is changed as the effective track gap Gt is maintained to be constant. Form FIG. 11, the following point can be understood.

More specifically, in the region where the track pitch Tp is relatively large, the average seek time is about 11 msec and substantially fixed without depending on the track pitch Tp. However, if the track pitch is less than 2.5 µm, the average seek time is sharply increased.

The above point can be considered as follows.

More specifically, if the track pitch Tp is set to be small as the effective track gap Gt is maintained to be constant, the above-mentioned effective track gap Gt is relatively larger than the width Te of the recording track effective signal region. For this reason, time for controlling the head to be adjustably set to the target track is increased at the time of the head seek. The average seek time can be allowed to about 12 msec. However, if the track pitch Tp is set to be smaller than 2.5 µm, the allowable time cannot be satisfied.

Although FIG. 11 shows an example when the tracking error δ is 0.1 µm, the change of the average seek time against the track pitch Tp shows the similar tendency even if the value of the tracking error δ is changed. To sum up, the average seek time depends on the ratio of the tracking error δ to the track pitch Tp, δ/Tp . Then, the average seek time is increased as the ratio becomes larger. According to the experiment, if δ/Tp>0.04, the average seek time is sharply increased to 12 msec or more. Even in a case of δ=0.1 µm shown in FIG. 11, if the track pitch Tp is larger than 2.5 δm, that is, δ/Tp>0.04, the average seek time is sharply increased.

In contrast, according to the present invention, the reproduction width Tr is set to be smaller than the effective track gap Gt, so that the average seek time can be controlled to be lower than the allowable value, for example, 12 msec if the track pitch Tp is set to be lower than 2.5 µm in a condition of δ=0.1 µm. In other words, the advantage of the present invention can be exerted when the track δ/Tp>0.04 is established.

As mentioned above, according to the present invention, the incomplete erasure phenomenon, which is caused by a track positioning error of the recording head, can be avoided by use of the side-fringe magnetic field leaking from the gap of the recording head to the outside of the recording track. As a result, the side-fringe magnetic field does not unnecessarily erase the signal of the adjacent track. Moreover, since the reproduction width is large, the reproduction output can be largely obtained, so that high SNR can be obtained.

Furthermore, even if the track pitch is narrowed to 2.5 µm or less, the average seek time can be sufficiently reduced, so that both the improvement of surface recording density and the high-speed head seek can be achieved.

(Second Embodiment)

The second embodiment explains the structure in which the head is controlled to be adjustably set onto a target track by use of the head and the magnetic disk, which are similar to the first embodiment, at the time of the head seek.

The difference between the first and second embodiments lies in the point that the reproduction width Tr is largely set, i.e. 0.9 µm. The width of the recording track effective signal region, Te=Tw−2δ is 0.88 µm when the recording width Tw=1 µm, and the tracking error δ=0.06 µm. Moreover, when the track pitch Tp=1.3 µm, the distance of the recording track effective signal region between the adjacent tracks, that is, effective track gap Gt=Tp−Te=0.42 µm.

The following will explain a state that the reproduction head approaches the target seek at the time of the head seek.

Figure 12:
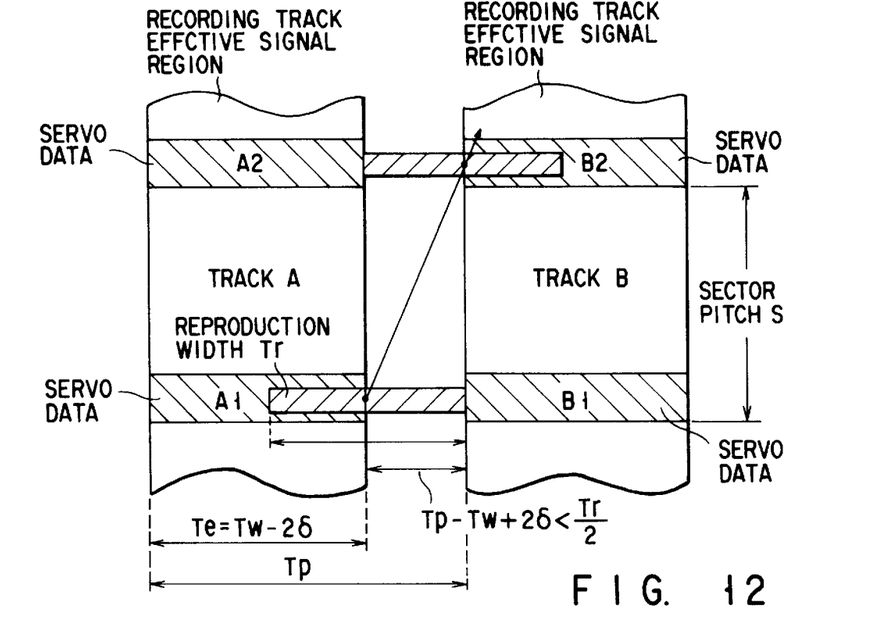
FIG. 12 is a schematic view showing a relationship among a state in that a head seek is performed, a reproduction width and a recording track effective signal region, and an effective track gap in a second embodiment of the present invention.

FIG. 12 is a view showing a state that the reproduction head approaches the target track B, and is positioned at the effective track gap region when the speed is reduced to be extremely low. The reproduction head is moved to the track B from the track A. The relative speed between the head and disk on the effective head gap region is Vc=9.6 m/sec, the head seek speed when the head is adjustably set onto the track B is Vr=0.002 m/sec, and the pitch between sectors on the adjacent recording tracks is S=1,280 µm. Under this state, Vc/Vr=4,800 and S/(Tp−Tw+2δ)=3,048, and they satisfy the condition of Vc/Vr>S/(Tp−Tw+2δ) shown in inequation (1). The state so far is the same as the first embodiment.

Then, in the second embodiment, the production width Tr defined by the reproduction head is set to 0.9 µm, which is larger than the effective track gap Gt=0.42 µm. In other words, the reproduction width Tr is set to satisfy the condition of Tr/2>Tp−Tw+2δ shown in inequation (3).

If the condition of inequation (3) is set, the width of 0.48 µm, which is more than ½ of the reproduction width Tr is positioned on the either the track A or the track B as shown in FIG. 12 even if the reproduction head is under the condition of inequation (1) at the time of the head seek, that is, the head is on the effective track gap region between the track A and the track B. Therefore, the reproduction head compares the first embodiment with either servo data A1 on the track A or servo data B2 on the track B, so that data can be surely read without fail. For this reason, by the tracking servo system (not shown), the head can be surely and adjustably set onto the track B for an extremely short period of time based on the read servo data.

As motioned above, according to the second embodiment, the head seek can be surely performed at higher speed, and the head can be surely and adjustably set onto the track B for an extremely short period of time based on the read servo data.

(Third Embodiment)

Figure 13:
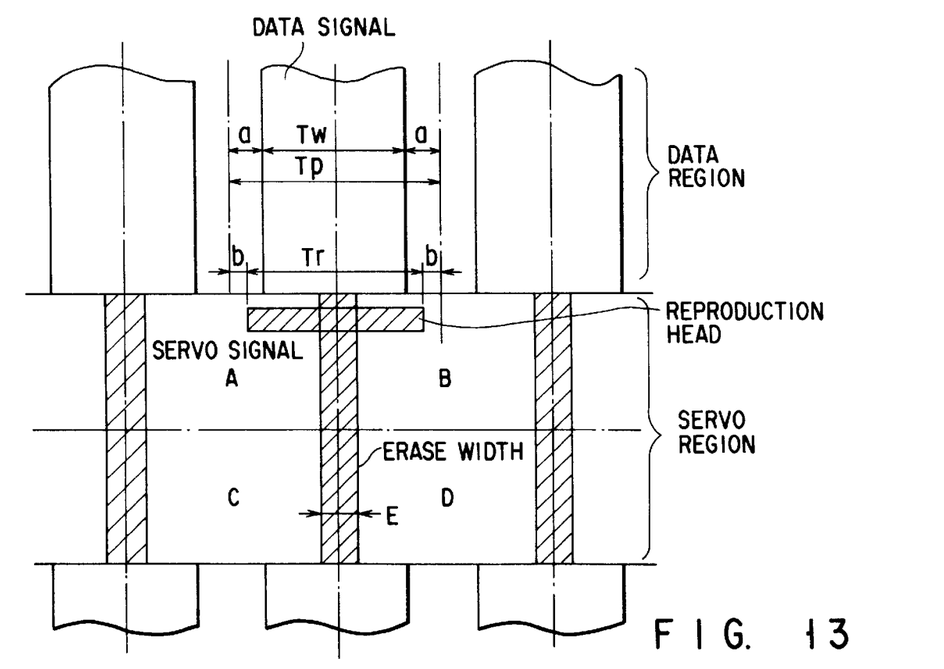
FIG. 13 is a structural view of arrangements of recording tracks in a third embodiment.

FIG. 13 shows the relationship among the recording width of the recording head, the reproduction width Tr of the reproduction head, and the track pitch Tp on the magnetic disk according to the the magnetic disk device of the third embodiment. In this case, when Tp−Tw=2a and Tp−Tr=2b, two conditions, that is, a>b and Tr<Tp+2a are satisfied. In other words, the reproduction width Tr is set to be larger than the recording width Tw, and the reproduction width Tr can be enlarged close to the maximum limit of Tp+2a.

More specifically, when the recording width Tw=1.5 µm, the reproduction width Tr=1.8 µm, and the track pitch Tp=2.0 µm, a=0.25 µm, b=0.1 µm, and the tracking error δ=0.1 µm. In this case, two conditions, that is, a>b and Tr<Tp+2a are set to be satisfied.

By setting the above conditions, the servo signal can be reproduced without deteriorating the quality of the servo signal even if the erase width E becomes wide, e.g., about 0.3 µm. Moreover, generation of an error, which is caused by reproducing the signal from the adjacent track, can be avoided.

In the above embodiments, the MR head was used as the reproduction head. However, the present invention can be applied to a case in which the other head such as an active head for performing the reproduction by use of a high frequency magnetic resonance phenomenon of a magnetic member, an induction type ring head, and an induction type perpendicular magnetic recording single-pole head.

As mentioned above, according to the present invention, even if the track pitch is narrowed to improve the surface recording density, time required for the head seek can be reduced, and data recording/reproducing can be performed at high speed.

Also, according to the present invention, there can be provided a magnetic disk device in which incomplete erasure phenomenon at the recording time and deterioration of quality of the signal caused by the signal erasure due to interference from the adjacent track, the recording density is high, and high reliability can be obtained in a case track pitch is reduced to improve the track density.

In addition, there can be provided a magnetic disk device in which a servo signal having a good quality can be reproduced, a tracking error is high, an error caused by tracking can be reduced to obtain high reliability, and a reproduction output is large to have a good SNR even if the track pitch is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic disk device comprising:
   a magnetic disk having a plurality of recording tracks each having a signal region, and a plurality of sectors dividing the magnetic disk in a circumferential direction; and
   a head device having a head width sized such that a signal received from each of two adjacent signal regions in a final stage of a seek operation satisfies Vc/Vr>S/(Tp−Tw+2δ) wherein Vc=a circumferential speed between said magnetic disk and said head device, Vr=a head seek speed in a track width direction of said head device, S=a sector pitch, Tp=a track pitch, Tw=a recording width, and δ=a tracking error width.

2. The magnetic disk device according to claim 1, wherein said head device comprises a recording head having a recording width Tw, and said recording width Tw satisfies at least one of Tr>Tp−Tw+2δ and Tr/2>Tp−Tw+2δ, where Tr is a reproduction width of a reproduction head.

3. The magnetic device according to claim 2, wherein a ratio of said tracking error width δ to said track pitch Tp is δ/Tp>0.04.

4. The magnetic device according to claim 2, wherein said magnetic disk has a condition of E≦Tp−Tw is satisfied for a width E of an erase area where a signal provided on both ends portions of said recording track on said magnetic disk is not presented.

5. The magnetic device according to claim 2, wherein a condition of Tr<Tp+2a is satisfied when a=(Tp−Tw)/2.

6. The magnetic device according to claim 1, wherein said head device comprises a reproduction head having a reproduction width Tr, and said, reproduction width Tr satisfies at least one of Tr>Tp−Tw+2δ and Tr/2>Tp−Tw+2δ.

7. The magnetic device according to claim 6, wherein a ratio of said tracking error width δ to said track pitch Tp, is δ/Tp>0.04.

8. The magnetic device according to claim 6, wherein said magnetic disk has a condition of E≦Tp−Tw is satisfied for a width E of an erase area where a signal provided on both end portions of said recording track on said magnetic disk is not presented.

9. The magnetic device according to claim 6, wherein a condition of Tr>Tp+2a is satisfied when a=(Tp−Tw)/2.

10. The magnetic disk device according to claim 1, wherein said head device comprises a recording head having a recording width Tw, a reproducing head having a reproduction width Tr, and said recording width and said reproduction width Tr satisfies at least one of Tr>Tp−Tw+2δ and Tr/2>Tp−Tw+2δ.

11. The magnetic device according to claim 10, wherein a ratio of said recording tracking error width δ to said track pitch Tp, is δ/Tp>0.04.

12. The magnetic device according to claim 10, wherein said magnetic disk has a condition of $E \leq Tp-Tw$ is satisfied for a width E of an erase area where a signal provided on both ends portions of said recording track on said magnetic disk is not presented.

13. The magnetic device according to claim 10, wherein a condition of $Tr<tp+2a$ is satisfied when $a=(Tp-Tw)/2$.

14. A magnetic disk device comprising:

a head device having at least a recording head having at least one of a recording width Tw and a reproducing head having a reproduction width Tr to satisfy at least one of $Tr>Tp-Tw+2\delta$ and $Tr/2>Tp-Tw+2\delta$;

a magnetic disk having a plurality of recording tracks which have a signal region having a recorded/reproduced signal, and said recording width Tw satisfies at least one of $Tr>Tp-Tw+2\delta$ and $Tr/2>Tp-Tw+2\delta$, and a plurality of sectors; and controlling means for providing a seek operation of said head device and said magnetic disk to satisfy $Vc/Vr>S/(Tp-Tw+2\delta)$, wherein $\delta$=a tracking error width Vc=a relative speed between said magnetic disk and said head device, and Vr=a head seek speed in a track width direction of said head device.

15. The magnetic device according to claim 14, wherein a ratio of said tracking error width $\delta$ to said track pitch Tp, $\delta/Tp$, is >0.04.

16. A magnetic disk according to claim 14, wherein said magnetic disk has a condition of $E \leq Tp-Tw$ is satisfied for a width E of an erase area where a signal provided on both ends portions of said recording track on said magnetic disk is not presented.

17. The magnetic device according to claim 14, wherein a condition of $Tr<Tp+2a$ is satisfied when $a=(Tp-Tw)/2$.

* * * * *